Figure 1:
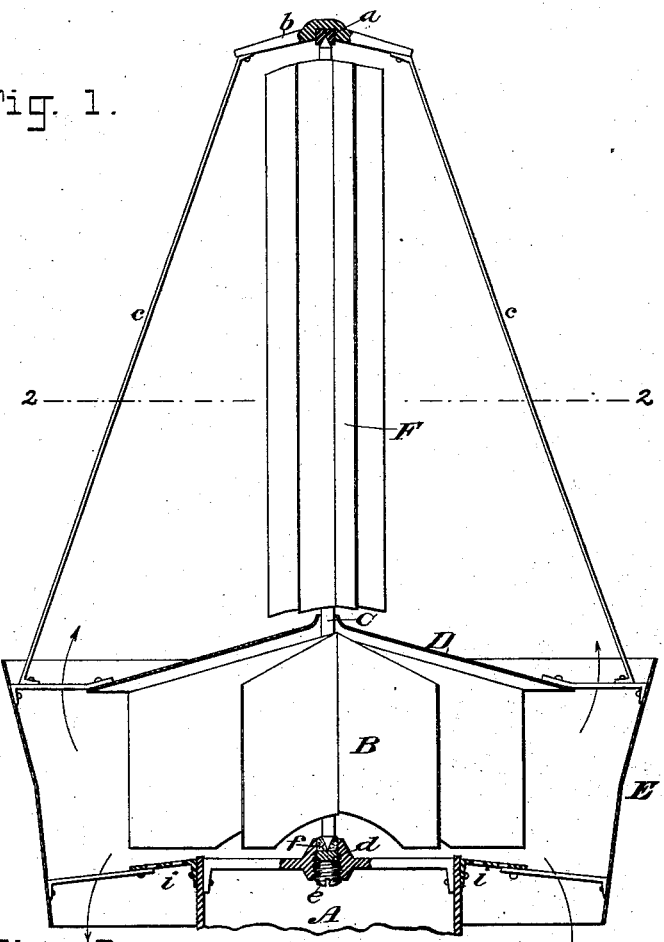

(Model.)

C. A. FREDERICKS.
VENTILATOR.

No. 248,092. Patented Oct. 11, 1881.

WITNESSES:
E. B. Bolton
Geo. Bainton

INVENTOR:
Christian A. Fredericks
By his Attorneys,
Burke, Fraser & Connett (Model.)

C. A. FREDERICKS.
VENTILATOR.

No. 248,092. Patented Oct. 11, 1881.

WITNESSES:
E. B. Bolton
Geo. Barton

INVENTOR:
Christian A. Fredericks
By his Attorneys,
Burke, Fraser & Hornett

UNITED STATES PATENT OFFICE.

CHRISTIAN A. FREDERICKS, OF BROOKLYN, NEW YORK.

VENTILATOR.

SPECIFICATION forming part of Letters Patent No. 248,092, dated October 11, 1881.

Application filed May 19, 1881. (Model.)

*To all whom it may concern:*

Be it known that I, CHRISTIAN A. FREDERICKS, a citizen of the United States, residing in Brooklyn, Kings county, New York, have invented certain Improvements in Ventilators, of which the following is a specification.

This invention relates to that class of ventilators wherein a rotary exhaust-fan is employed to remove the air from the ventilating-shaft and accelerate the draft therein and a motor-wheel rotated by the wind is employed to rotate the exhaust-fan.

Ventilators of the above-described character generally employ a motor-wheel fixed to the same shaft with the exhaust-fan and exceeding the latter in diameter. These I find to answer very well for small shafts where both fan and wheel are of small size, but for larger shafts they are entirely inadequate. The reason for this lies in the fact that the peripheral speed of the motor-wheel is never greater than the speed of the wind, and with a given velocity of the air-current the angular velocity will be inversely as the diameter of the motor-wheel.

Heretofore, so far as I am aware, such ventilators have been constructed after one model, or in one proportion, for all sizes of shafts, and whenever it was necessary to increase the diameter of the exhaust-fan the motor-wheel was likewise increased in diameter. In following this method I found that in constructing the ventilator described in my Patent No. 240,245, of April 19, 1881, it would do good work when made on a small scale, but was useless when tried on a larger scale, by reason of the low angular velocity of the motor-wheel in light winds. Consequently when a wheel of larger diameter is employed for the purpose of insuring blade-surface and leverage enough to rotate a large exhaust-fan it will be found that the fan will not have speed enough to exhaust the air unless the velocity of the wind be exceptionally great.

To overcome this defect is the object of my present invention, which consists, essentially, in combining with an exhaust-fan arranged to exhaust the air from a ventilating-shaft a motor-wheel arranged to drive the said exhaust-fan and to give it a greater peripheral velocity than that of the motor-wheel itself. At the same time the motor-wheel is powerful enough to give the fan the proper speed to enable it to exhaust effectively. This I effect by reducing the diameter of the motor-wheel until it will have the proper angular velocity with a wind of low velocity, and maintaining it at this, or nearly so, no matter how much the diameter of the fan may be increased, to suit large ventilating-shafts. Then, to get the requisite blade-surface to give the motor-wheel power to rotate the fan effectually with a light wind, I extend said motor-wheel axially. Thus, in enlarging the ventilator it will be seen that I enlarge the fan diametrically and the motor-wheel axially, while the diameter of the motor-wheel and the axial measurement of the fan are not materially altered. As the fan is enlarged diametrically, the angular velocity remaining constant, its peripheral velocity will be increased, and this will increase its effectiveness somewhat; but the work it will be required to perform will also be increased in a corresponding ratio, so that, with a given angular velocity, the conditions will remain about the same, however much the diameter may be increased.

Figure 2:
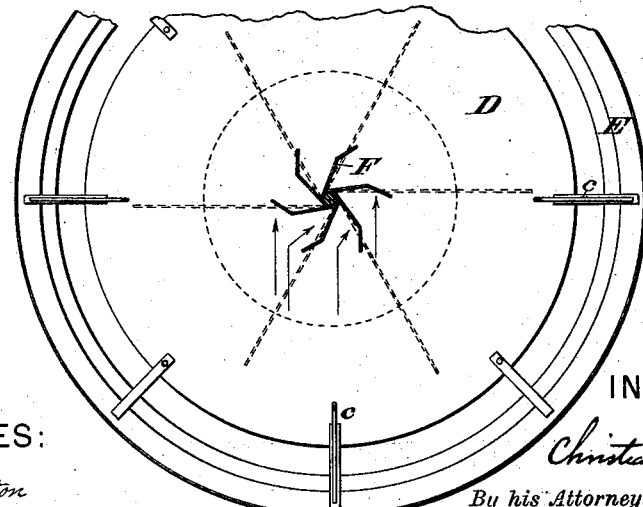
Figure 3:
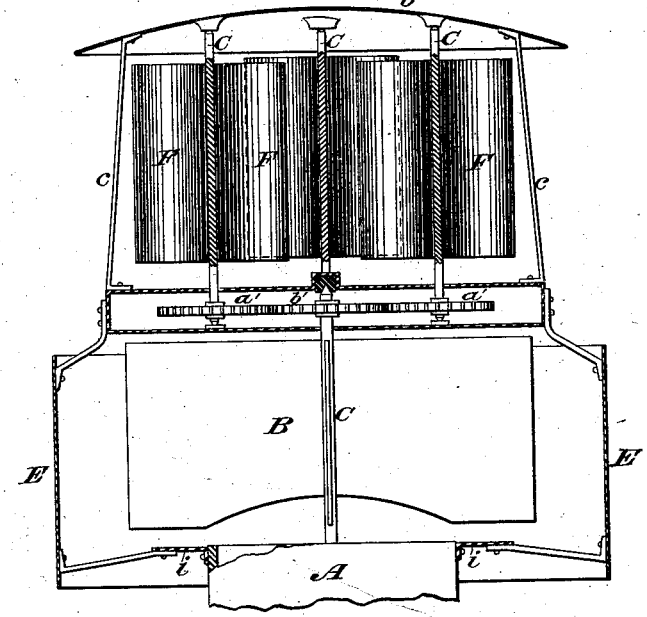

In the drawings which serve to illustrate my invention, Figure 1 is a vertical sectional elevation of my improved ventilator, the rotative parts being in elevation and the stationary parts in mid-section. Fig. 2 is a sectional plan of the same on the line 2 2 in Fig. 1. Fig. 3 is a vertical mid-sectional view, illustrating a modification of my improved ventilator.

The approved mode of carrying out my invention is illustrated in Figs. 1 and 2, wherein A is an ordinary ventilating-shaft, over the top of which is mounted an ordinary exhaust-fan, B, on an arbor or axis, C. Over the fan is fixed a cap or roof, D, which is connected with the ventilating-shaft by means of a conical band or housing, E, preferably of sheet metal or similar material. The object of this band or shield is to prevent the wind from acting injuriously upon the exhaust-fan, and at the same time permit the escape of the air exhausted by the fan, as indicated by the arrows. To impart speed enough to a fan of this kind to thoroughly exhaust the air even when the velocity of the wind is slight, it is requisite that the fan have considerable peripheral velocity, and this cannot be obtained, if the fan is large, through a motor-wheel having a diameter equal or nearly equal to that of the fan and fixed to the same shaft in the usual way; and if a wheel of less diameter be employed for the purpose of insuring sufficient angular velocity the leverage and blade-surface will be reduced so much that it will not have power to rotate the fan.

To obviate the difficulty I employ, by preference, a motor-wheel, F, mounted on the prolongation of the axis C. This wheel is reduced in diameter sufficiently to give the required angular velocity to the fan with a light wind, and elongated axially to obtain sufficient blade-surface for the wind to act upon; whereby power to rotate the fan is obtained. In other words, the effective working power of the motor-wheel is not disturbed, while its angular velocity is increased to the desired extent by reducing its diameter.

For large ventilators, and to these alone, I propose to apply my improvements. The diameter of the fan will always be greatly in excess of that of the motor-wheel, and the axial measurement of the motor-wheel will always greatly exceed that of its diameter, and this disparity will always increase with the size of the ventilator.

To lessen the friction at the bearings of the axis C its upper end is provided with a bearing-block, $a$, of "metaline," so called, fixed in a plate or spider, $b$, supported on brace-rods $c\ c$.

The lower end of the axis is of steel, hardened and pointed, and the joint rests in a slight indentation in a hardened-steel plate or disk, $d$, which rests on the end of an adjusting-screw, $e$. This screw forms the bottom of a socket, $f$, in a spider fixed in the ventilating-shaft.

I have found that where glass bearings are employed ashes and grit will get into the bearings and cut them out. If steel is used it will rust out in a short time unless protected. To effect the necessary protection, I form the receptacle or socket $f$ around the bearing-point and fill this with powdered plumbago or black lead. This prevents the grit or ashes from getting at the bearing, and also prevents oxidation of the parts. In lieu of plumbago powdered steatite or other similar anti-friction material may be employed.

By reference most particularly to Fig. 2 it will be seen that the blades of the motor-wheel are attached tangentially to the shaft or arbor, and curved or bent so as to oppose a concave face to the wind. This tangential arrangement of the blades has the effect to enlarge the useful area exposed to the wind, as best indicated by the broken arrows in Fig. 2, which show the direction of the wind, and how it is deflected by the tangential attachment of the blades. This curvature of the blades of the motor-wheel I employ by preference; but I may employ plane or flat blades with good results, provided the other conditions of the construction of the motor-wheel are adhered to— that is to say, if the blades be extended axially to get blade-surface enough to compensate for reduced diameter.

Where the fan is very large and the upward extension or elongation of the motor-wheel would be excessive, the modification illustrated in Fig. 3 might be employed. In this construction the motor-wheel is cut into four short sections, each mounted in separate bearings. On the lower ends of their arbors are fixed gear-wheels $a'\ a'$, which mesh with a gear-wheel, $b'$, on the fan-arbor. By this construction the joint effect of the motor-wheels is to rotate the fan. This construction is equivalent to one long motor-wheel cut into several lengths, and each applied independently to assist in rotating the fan.

The flange $i$ around the margin of the shaft A may be perforated, if desired, to prevent the collection of moisture in cold weather, which is liable to freeze and clog the fan. The shield E may or may not be of foraminous material.

I am aware that a motor-wheel having a diameter a little less than the exhaust-fan has been shown in ventilators; but the disparity in diametrical measurement has not been such as would materially affect the operation of the device, and such constructions have doubtless been limited to small ventilating-shafts. Such a construction is shown in the patent of A. P. Blake, dated January 31, 1865, No. 46,067, and I hereby disclaim the subject-matter of said patent.

Having thus described my invention, I claim—

1. The combination, to form a ventilating apparatus, of an exhaust-fan mounted at the top of the shaft, and a wind motor-wheel above and on the same shaft or arbor with the fan, the said fan having a diameter much greater than that of the motor-wheel, and the said motor-wheel being axially extended sufficiently to give it a blade area or surface greater than that of the fan, substantially as and for the purposes set forth.

2. The combination, to form a ventilating apparatus, of a centrifugal exhaust-fan arranged at the top of the ventilating-shaft, and a wind-motor wheel above and on the same shaft or arbor with the fan, the said fan having a diameter much greater than that of the motor-wheel, and the motor-wheel having an axial measurement greater than its diametrical measurement, substantially as and for the purposes set forth.

3. A ventilating apparatus comprising a centrifugal exhaust-fan arranged over the top of the ventilating-shaft, as shown, a cap or roof for the fan, a wind-motor wheel over the roof arranged to rotate the fan, and a shield, E, arranged around the fan to protect it against the force of the wind, but so as to leave ample space above and below for the escape of the air and gases expelled by the fan, substantially as and for the purposes set forth.

4. A motor-wheel for actuating the fan of a ventilator having an axial measurement greatly exceeding its diametrical measurement, and its blades bent into a curved form and attached to the arbor or shaft tangentially, whereby great angular velocity is obtained without loss of power, substantially as set forth.

5. An apparatus capable of ventilating large shafts when actuated only by light winds, comprising a centrifugal exhaust-fan arranged over the top of the shaft and adapted to be rotated, and a wind-motor wheel above the fan and mounted on the same arbor, said motor-wheel having a diameter much less than that of the fan, and an axial measurement greater than its diametrical measurement, and having its blades curved, as shown, and secured tangentially to its arbor, substantially as and for the purposes set forth.

6. The combination, to form a bearing for the pointed arbor of ventilating-fan, of the socketed spider or support, the hardened plate or disk $d$, to bear up the arbor, the adjusting-screw $e$, and the filling in the socket $f$, substantially as set forth.

7. A bearing for the arbor of a ventilating-fan, which comprises a cup-like socket with a hardened-steel plate or disk at its bottom, having a slight indentation to receive the pointed tip of the arbor, and a filling of powdered plumbago in the said socket around the arbor to protect the latter and the bearing-plate from oxidation and foreign abrasive substances, substantially as set forth.

In witness whereof I have hereunto signed my name in the presence of two subscribing witnesses.

CHRISTIAN A. FREDERICKS.

Witnesses:
  HENRY CONNETT,
  ARTHUR C. FRASER.